(12) United States Patent
LaChance et al.

(10) Patent No.: US 7,017,038 B1
(45) Date of Patent: Mar. 21, 2006

(54) METHOD AND SYSTEM TO PROVIDE FIRST BOOT TO A CPU SYSTEM

(75) Inventors: Guy F. LaChance, San Jose, CA (US); Jan S. Wesolowski, Redwood City, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 465 days.

(21) Appl. No.: 10/229,322

(22) Filed: Aug. 26, 2002

(51) Int. Cl.
*G06F 9/445* (2006.01)

(52) U.S. Cl. .......................................................... 713/2
(58) Field of Classification Search ...................... 713/2
See application file for complete search history.

(56) References Cited

U.S. PATENT DOCUMENTS 6,317,879 B1 * 11/2001 Jacobson et al. ........... 717/127
6,678,741 B1 * 1/2004 Northcutt et al. ........... 709/248
2003/0200354 A1 * 10/2003 Jaffrey ........................ 709/321

* cited by examiner

*Primary Examiner*—John R. Cottingham
(74) *Attorney, Agent, or Firm*—Brian N. Young; Townsend and Townsend and Crew, LLP

(57) ABSTRACT

A boot-up operation system is provided. In one exemplary embodiment, the system includes a CPU, a bootstrap memory, a boot memory, a main memory, an I/O port and CPU operating system code. When the system is turned on, the CPU executes the bootstrap program which directs it to determine whether the boot memory contains the necessary code to perform the boot-up operation. If the boot memory contents are usable for boot-up operation, the CPU starts executing a boot program that is stored in the boot memory. If the boot memory contents are not usable for boot-up operation, the bootstrap program directs the CPU to download a copy of the CPU operating system code from outside the system using the I/O port. After the download, the CPU stores a copy of the downloaded operating system code and the boot program into the boot memory for future use.

23 Claims, 4 Drawing Sheets

METHOD AND SYSTEM TO PROVIDE FIRST BOOT TO A CPU SYSTEM

BACKGROUND OF THE INVENTION

The present invention generally relates to effecting CPU boot-up. More specifically, the present invention relates to a method and system for booting up a CPU which has its boot memory that is either blank (e.g., not yet programmed) or corrupted using a bootstrap program.

In some conventional computer systems, boot code for starting up a CPU is typically preprogrammed into a non-volatile storage device, such as, a ROM or FLASH memory. The ROM or the FLASH memory is then soldered onto a printed circuit board that is coupled to the CPU. Using the ROM or the FLASH memory to store boot code in this manner is quite inefficient and not cost effective for a number of reasons. For example, when the boot code is stored in the FLASH memory, the soldering process may corrupt the contents of the FLASH memory. The contents of the FLASH memory may also get corrupted by a disturbance in the system during the update process when the FLASH memory is updated. Consequently, the corrupted FLASH memory has to be unsoldered from the board, reprogrammed accordingly, and then resoldered back onto the board. The unsoldering and soldering of the modern, high-pin-density chips is a precise, delicate and time consuming process. This process requires special tools generally not available at a user site and is not entirely risk free. Physical damage almost always happens to the ROM or the FLASH memory during the unsoldering and soldering process, thereby resulting in the need for replacement. Similarly, physical damage can also be done to the printed circuit board. As a result, the cost associated with the unsoldering and soldering process can be very high.

Alternatively, the ROM or the FLASH memory may be secured to the board using sockets. These sockets are typically very expensive and unreliable. Therefore, frequent physical removal of the ROM or the FLASH memory from the board similarly causes problems.

If the boot code stored in the ROM or the FLASH memory is corrupted, then the CPU will not be able to initiate a boot-up operation. Hence, it would be desirable to provide a system for providing and managing a first CPU boot-up operation in a more efficient manner.

SUMMARY OF THE INVENTION

A system for providing and managing a CPU boot-up operation for a computer system using a bootstrap program is provided.

According to an exemplary embodiment, the system includes a CPU, a bootstrap memory, a boot memory, a main memory, an I/O port and CPU operating system code. In one exemplary implementation, the bootstrap memory and the boot memory are implemented using, respectively, one or more memory blocks embedded in a field-programmable gate array (FPGA) and a FLASH memory. The bootstrap memory is used to store a bootstrap program and the boot memory is used to store a boot program and the CPU operating system code.

The system operates in the following exemplary manner to perform a boot-up operation. When the system is turned on, the CPU, directed by instructions of the bootstrap program fetched from the FPGA, checks the boot memory to determine whether the boot memory contains the necessary code to perform a successful boot-up operation. At this point, the CPU is operating under the control of the bootstrap program. If the bootstrap program determines that the boot memory contents are usable for boot-up operation, then the bootstrap program starts to fetch further instructions from the boot program stored in the boot memory (i.e., executes the boot program) thereby allowing, amongst other things, the boot-up operation to continue and eventually leading to the transfer of a copy of the CPU operating system code from the boot memory to the main memory. The boot-up operation ends when the boot program determines that the CPU operating system code in the main memory has no detectable errors. At this point, the CPU executes the CPU operating system code and control of the CPU is passed to the operating system.

If the bootstrap program determines that the boot memory contents are not usable for boot-up operation, then the bootstrap program directs the CPU to download a copy of the CPU operating system code from outside of the system. The source of the copy of the CPU operating system code is provided by a system user and received in the form of a data stream coming through the I/O port. The bootstrap program provides a user interface to the system user to allow the system user to supply information relating to the source of the copy of the CPU operating system code. The copy of the CPU operating system code received via the I/O port is then loaded into the main memory. Similarly, a copy of the boot program may be received via the I/O port. After the copy of the CPU operating system code is loaded into the main memory, the CPU verifies its integrity and, if the integrity is acceptable, begins its execution. Preferably, one of the first tasks of the CPU operating system that has been newly loaded from the outside is programming a copy of the CPU operating system code as well as a copy of the boot program into the boot memory. As a result, next time the system is started up, the CPU can use these copies to perform the boot-up operation.

The present invention provides a number of benefits and/or advantages. For example, by using the present invention, the boot program for starting up a CPU does not have to be preprogrammed into a non-volatile storage device, such as, a ROM or FLASH memory, before such device is soldered onto the printed circuit board. As a result, the FLASH memory does not have to be unsoldered or replaced due to programming mistakes. A reduction of the frequency of physical removal of the FLASH memory helps minimize problems that might occur in connection with the physical removal of the FLASH memory.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
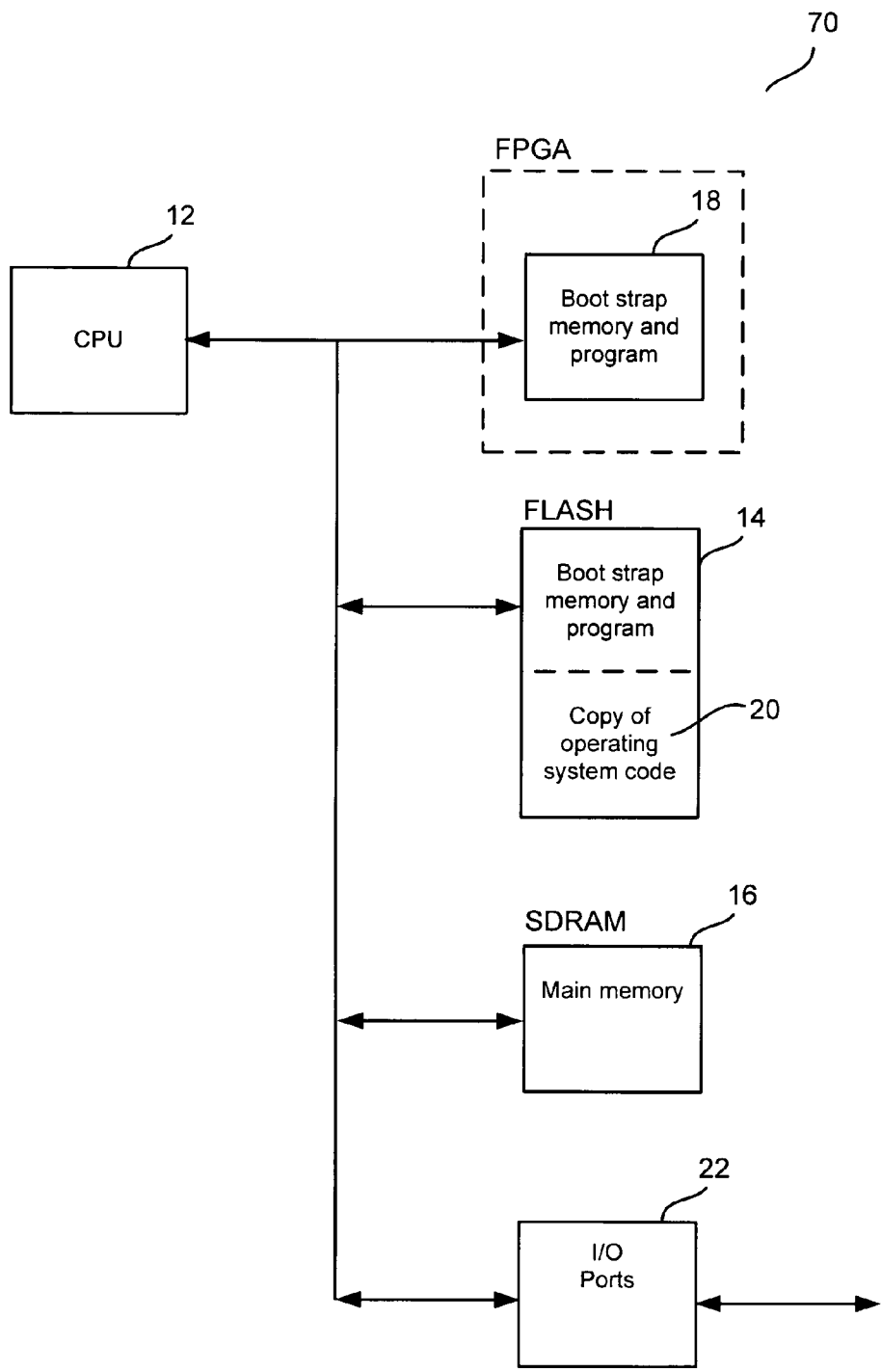
FIG. 1 is a simplified block diagram illustrating a system according to an exemplary embodiment of the present invention.

The present invention in the form of an exemplary embodiment will now be described. FIG. 1 shows an exemplary embodiment of a system 10 according to the present invention. Referring to FIG. 1, the system 10 includes a CPU 12, a bootstrap memory 18, a boot memory 14, a main memory 16, an I/O port 22, and CPU operating system code 20. It should be understood that the system 10 may include other components that are not shown. Different types of components may be included in the system 10 depending on the particular design and/or application.

In an exemplary embodiment, the bootstrap memory 18 is implemented using one or more memory blocks embedded in a field programmable gate array (FPGA). The FPGA is generally configured via a JTAG interface and may include a memory that can be used to store programs. In an exemplary embodiment, the bootstrap memory 18, implemented within the FPGA, is used to store a bootstrap program. As will be further explained below, the bootstrap program is used by the CPU 12 to initiate a boot-up operation to start the system 10 and perform an operating system download operation when the boot memory 14 is either blank or corrupted.

In an exemplary embodiment, the boot memory 14 is a FLASH memory. The boot memory 14 is used to store a boot program and a copy of the CPU operating system code 20. The boot program and the CPU operating system code 20 are used to initiate a boot-up operation to start the system 10.

Figure 2:
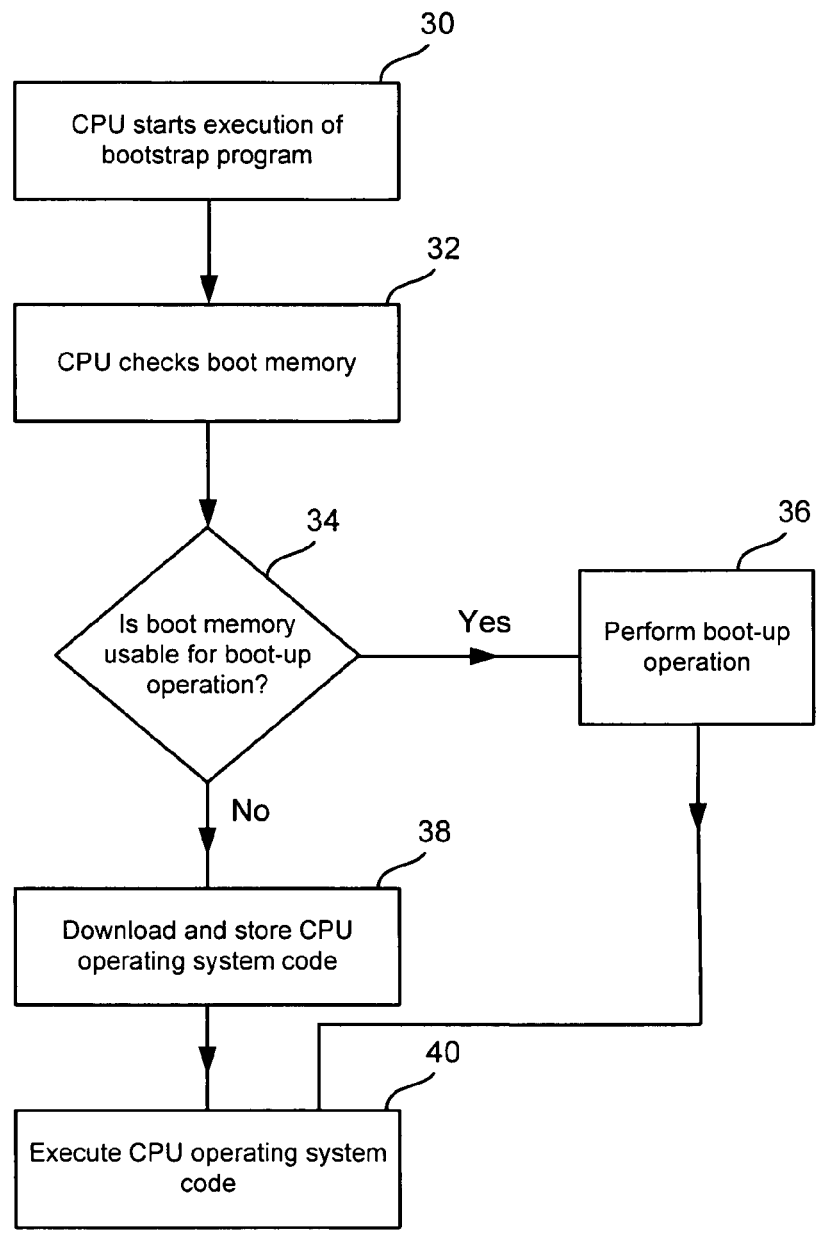
FIG. 2 is a flow diagram illustrating the exemplary operations of a system according to an exemplary embodiment of the present invention to initiate a boot-up operation.

The system 10 operates in the following exemplary manner to perform a boot-up operation. FIG. 2 is a flow diagram illustrating the exemplary operations of the system 10 to initiate a boot-up operation. At 30, when the system 10 is turned on, the CPU 12 starts executing the bootstrap program stored in the bootstrap memory 18. At this point, the CPU 12 is operating under the control of the bootstrap program. The CPU 12 verifies that the main memory 16 has no defects and can be used for storing and executing the operating system. Detecting errors in the main memory 16 is considered fatal. If one or more errors are detected, the CPU 12 sends an appropriate message to a system user through the I/O port 22 and suspends further operation.

At 32, the CPU 12 computes a checksum on the contents of the boot memory 14 that can be used to determine whether the boot memory 14 contains the necessary code to initiate the boot-up operation. The boot memory 14 may not be usable to perform the boot-up operation. For example, in some situations, the boot memory 14 may either be blank (i.e., not yet programmed) or corrupted.

At 34, the CPU 12 evaluates the checksum to determine whether the boot memory 14 is usable to perform the boot-up operation, i.e., the CPU 12 verifies that the checksum computed on the contents of the boot memory 14 has a value that is indicative of acceptable integrity.

If the CPU 12 determines that the contents of the boot memory 14 are usable for boot-up operation, then at 36, the CPU 12 starts executing the boot program from the boot memory 14. The boot program includes instructions that are designed for testing and initializing the CPU system hardware and loading the CPU operating system code 20 from the boot memory 14 to the main memory 16. After successfully loading the CPU operating system code 20 into the main memory 16, at 40, the CPU 12 executes the CPU operating system code 20 to start the operating system.

If the CPU 12 determines that the contents of the boot memory 14 are not usable for boot-up operation, then at 38, the CPU 12 uses the I/O port 22 to send an appropriate message to the system user prompting the system user to provide information that allows a copy of the CPU operating system code 20 to be downloaded from an external source. In an exemplary embodiment, a user interface is provided to the system user to gather the desired information. The downloading is accomplished via the I/O port 22. The CPU 12 then proceeds to copy the data representing the CPU operating system code 20 and arriving at the I/O port 22 to the main memory 16. The data is stored in the main memory 16 in an area beginning at a predefined address. In an exemplary embodiment, the I/O port 22 is implemented in the form of an universal asynchronous receiver/transmitter (UART). Similarly, at 40, after the copy of the CPU operating system code 20 is loaded into the main memory 16, the CPU 12 begins its execution.

As mentioned above, in an exemplary embodiment, the boot memory 14 is a FLASH memory that is programmable. As one of its early tasks, the operating system can, optionally, direct the CPU 12 to program a copy of the CPU operating system code 20 as well as a copy of the boot program into the boot memory 14. After storing a copy of the boot program and the CPU operating system code 20 in the boot memory 14, the CPU 12 can then use such copies to perform a boot-up operation next time the system 10 is to be started up.

Figure 3:
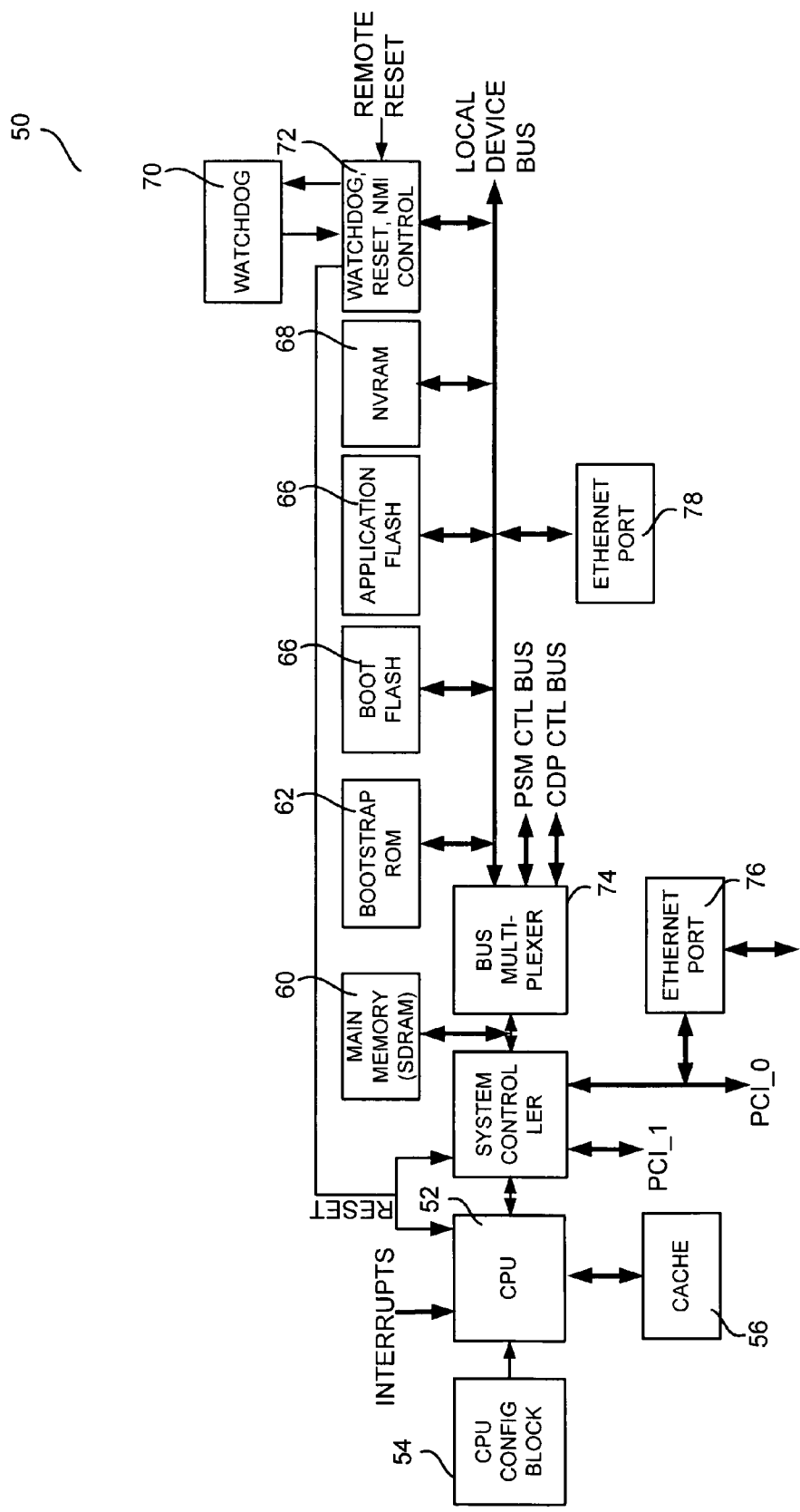
FIG. 3 is a simplified block diagram further illustrating the system shown in FIG. 1 according to an exemplary embodiment of the present invention.

One exemplary embodiment of the system 10 is further illustrated in more details in FIG. 3. As shown in FIG. 3, the system 50 includes a CPU 52, a CPU configuration block 54, a cache 56, a system controller 58, a main memory 60, a bus multiplexer 74, a bootstrap ROM 62, a boot FLASH 64, an application FLASH 66, a non-volatile RAM data memory (NVRAM) 68, a watchdog module 70, a watchdog reset and non-maskable interrupt control module 72, Ethernet port 76, and a serial port (UART) 78.

The system controller 58 interfaces the CPU 52 to the remaining elements of the CPU system, as shown in FIG. 3, including the main memory 60 and the bus multiplexer 74. In one exemplary implementation, the main memory 60 is implemented as a 256 Mbyte SDRAM organized as 32M of 64-bit data and 8-bit data parity, zero wait-state access at a bus frequency of 75 MHz. The system controller 58 provides a boot memory chip select and four programmable chip selects (not shown)—each with programmable address mapping and timing parameters. The system controller 58 also provides a four-channel DMA controller and two PCI bus bridges. One of the PCI bus bridges allows CPU communications through the Ethernet port 76.

The bus multiplexer 74 further interfaces the CPU to the bootstrap ROM 62, the boot FLASH 64, the application FLASH 66, the NVRAM 68, the serial port (UART) 78, and the watchdog reset and non-maskable interrupt control module 72 via a local device bus. The bus multiplexer 74 also interfaces the CPU with other components (not shown) via a cell data path (CDP) control bus and a packet processing subsystem (PSM) control bus.

One of the functions of the bus multiplexer 74 is to isolate the main memory 60 from the local device bus, the CDP control bus and the packet processing subsystem control bus. In addition, the bus multiplexer 74 also provides a number of other functions, including, (1) selecting data from the local devices, packet processing subsystem and cell data path ASICs to the system controller 58, (2) decoding addresses and generating device select signals for the boot FLASH 64, the application FLASH 66, the NVRAM 68, and interface registers located in the bus multiplexer 74 and other FPGAs (not shown), (3) performing the bootstrap ROM function for system wakeup, and (4) maintaining three RS-232 serial ports UARTs (only one of them, UART 78 is shown) for system debugging and low-level maintenance.

Figure 4:
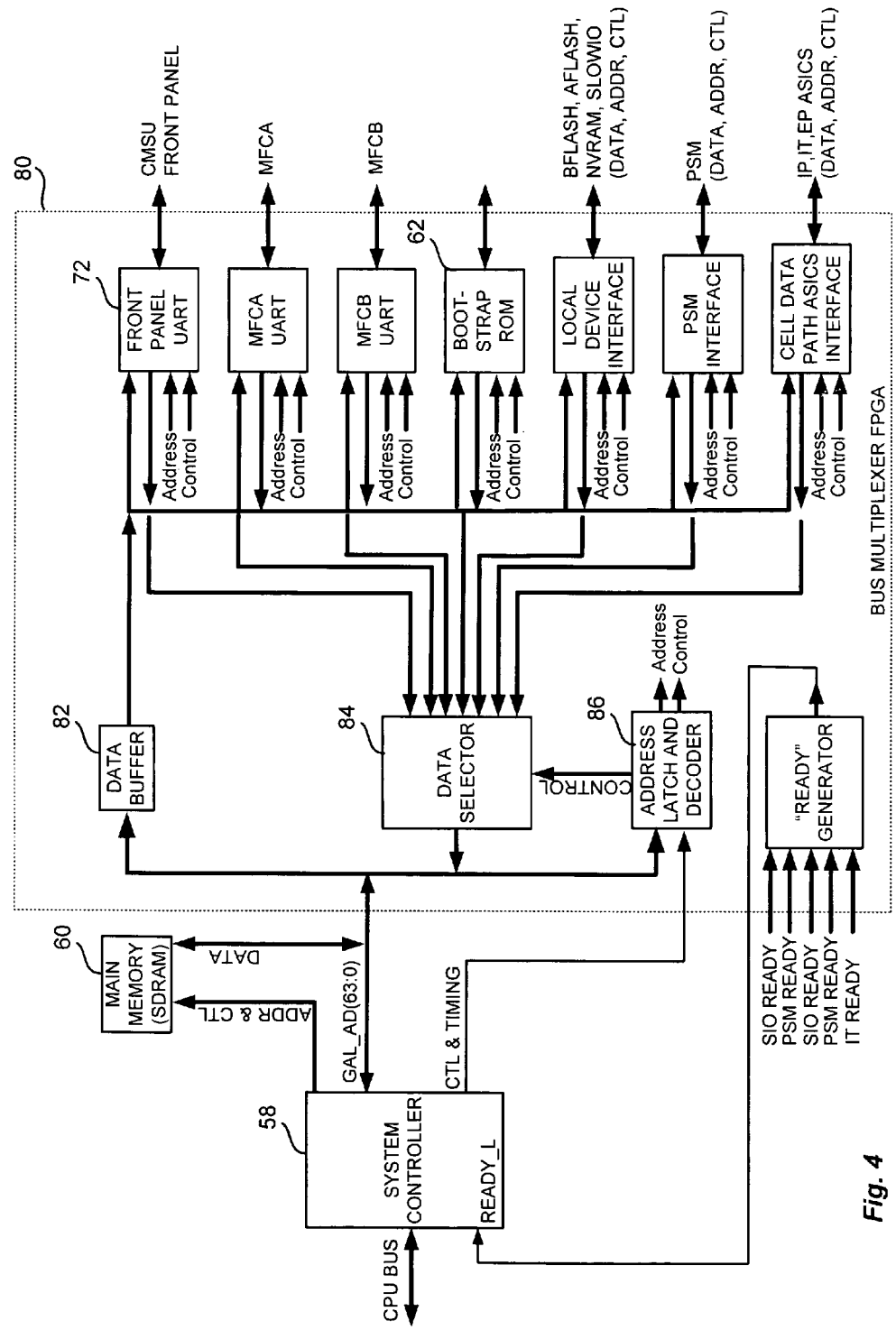
FIG. 4 is a simplified block diagram further illustrating the system shown in FIG. 1 according to an alternative exemplary embodiment of the present invention.

FIG. 4 is a simplified block diagram illustrating an exemplary alternative embodiment of the system 10 in accordance with the present invention. This alternative embodiment is implemented using a bus multiplexer FPGA 80. The 64-bit multiplexed data/address device bus comes from the system controller 58. The bus multiplexer 74 as shown in FIG. 3 is implemented using an address latch and decoder 86, a data selector 84 and a data buffer 82, as shown in FIG. 4. The bus multiplexer 74 latches the 24-bit address and 6-bits of device control signals (write enable and five raw chip selects).

The read/write signal and raw chip selects combined with further decoded addresses and the CS-TIMING_L signal from the system controller 58 provide bus control signals for the boot FLASH 64, the application FLASH 66, the NVRAM 68, the bus multiplexer FPGA internal registers, interfaces and registers in other FPGAs and ASICs.

During CPU write accesses, the bus control signals enable the data bus drivers sending data from the system controller 58 to the accessed device. During CPU read accesses, the data bus drivers to the peripherals are tri-stated. Instead, data coming from these peripherals is passed to a data selector, which selects data from the accessed device and drives it onto the bus to the system controller 58. The five (5) raw device selects extracted by the bus multiplexer FPGA 80 control the following devices (data bus widths of these devices are shown in parentheses): BootCS—the bootstrap ROM 62, the boot FLASH 64—read (32 bit); CS0—bus multiplexer registers, UARTs (32 bit); CS1—the NVRAM 68 (8 bit), the boot FLASH 64—write (32 bit); CS2 and CS3—other FPGAs and ASICs in the system (32 bit).

As shown in FIG. 4, the bus multiplexer FPGA 80 uses the local device bus to communicate with various components. The local device bus includes 32-bit data lines, twenty-four (24) address lines, chip selects, and write enable lines. The local device bus is used for, among other functions, accessing the bootstrap ROM 62, the boot FLASH 64, the application FLASH 66, the NVRAM 68, and the serial port (UART) 78.

As mentioned above, in one exemplary embodiment, the bootstrap ROM function is implemented using memory blocks embedded in a FPGA. In an alternative exemplary embodiment as shown in FIG. 4, the bootstrap ROM 62 function is embedded in the bus multiplexer FPGA 80. More specifically, the embedded memory blocks of the FPGA are configured as ROM and initialized during the power-on FPGA configuration with a bootstrap program containing a basic system boot code. In one exemplary implementation, the size of the bootstrap ROM 62 is 1.5k of 32-bit words.

The system 50 operates in the following exemplary manner. Coming out of reset, the CPU 52 starts executing the boot code stored in the bootstrap program residing in the bootstrap ROM 62. The bootstrap code instructs the CPU 50 to compute checksum of the boot FLASH 64. If the boot FLASH 64 has been programmed and the computed checksum value confirms its integrity, the boot code then instructs the CPU 50 to continue the boot process from the boot FLASH 64. The CPU 50 sends a one-bit command to the bus multiplexer 74 to de-activate the bootstrap ROM 62 and activate the boot FLASH 64. The bus multiplexer 74 eliminates the bootstrap ROM 62 from the CPU memory map and maps the boot FLASH 64 to the base address previously used for the bootstrap ROM 62.

If the checksum verification fails, the boot code in the bootstrap ROM 62 uses the serial port (UART) 78 which functions as the CPU card's front panel RS-232 interface, and assuming that the interface is connected to a workstation which runs a terminal emulation program (UNIX TIP session, for instance), prompts the user of the system for the operating system download. After the download, the user uses the firmware upgrade functionality of the operating system for burning the operating system and the boot program into the boot FLASH 64. By having the operating system in the boot FLASH 64, the next boot-up operation can be automatically performed from the boot FLASH 64.

Functionality provided by the bootstrap program in the bootstrap ROM 62 allows CPU boards to be assembled with blank FLASH memories. The checksum calculated on a blank FLASH memory returns a non-zero result and initiates the process of the first operating system download and programming it into the boot FLASH 64. The foregoing process can also be used to reprogram the boot FLASH 64 if boot FLASH 64 becomes corrupt during the life of the system 50.

In one exemplary embodiment, the code contained in the boot FLASH 64 performs a number of functions, including, CPU startup, running power-on self test (POST) on the entire card, booting the operating system, and providing communication with serial interfaces, Ethernet interfaces and a workstation controlling system (NCP).

It should be understood that the present invention can be implemented using software, hardware, or a combination of both. Based on the disclosure provided herein, it will be clear to a person of ordinary skill in the art that other ways and/or methods can be used to implement the present invention.

It should be further understood that the present invention can be deployed and/or applied in different applications and/or systems. Based on the disclosure provided herein, it will be clear to a person of ordinary skill in the art as to how to deploy and/or apply the present invention in different applications and/or systems.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for providing a boot-up operation for a computer system, comprising:
   a CPU;
   a main memory;
   a boot memory configured to store contents including a boot program and CPU operating system code, wherein the boot program is configured to initiate a boot up operation of the computer system;
   a bootstrap memory configured to store a bootstrap program; and
   an I/O port;
   wherein upon system initiation and before the boot program initiates the boot up operation of the computer system, the CPU executes the bootstrap program, wherein the bootstrap program checks the boot memory to determine if the boot memory contents are usable for the boot-up operation; and wherein upon determining that the boot memory contents are not usable for the boot-up operation, the CPU is directed by the bootstrap program to download a copy of the CPU operating system code via the I/O port into the main memory to allow the boot-up operation to be continued.

2. The system of claim 1 wherein upon the CPU executing the bootstrap program, the CPU is directed to check the main memory for error; and wherein if an error is found in the main memory, the CPU is directed to suspend any further operations.

3. The system of claim 1 wherein after the copy of the CPU operating system code has been downloaded into the main memory, the CPU executes the copy of the CPU operating system code thereby causing the copy of the CPU operating system code in the main memory and a copy of the boot program retrieved via the I/O port to be copied into the boot memory; and wherein copies of the boot program and the CPU operating system code in the boot memory are used to initiate the next boot-up operation.

4. The system of claim 1 wherein upon determining that the boot memory contents are usable for the boot-up operation, the CPU is directed by the bootstrap program to perform the boot-up operation using the boot program and the CPU operating system code that are stored in the boot memory.

5. The system of claim 1 wherein the boot memory is implemented using a FLASH memory that is programmable.

6. The system of claim 1 wherein the bootstrap memory is implemented using a field programmable gate array.

7. A system for providing a boot-up operation for a computer system, comprising:
   a CPU;
   a main memory;
   a boot memory having a boot program and CPU operating system code stored therein, wherein the boot program is configured to initiate a boot up operation of the computer system;
   a bootstrap memory having a bootstrap program stored therein; and
   an I/O port;
   wherein upon system initiation, and before the boot program initiates the boot up operation of the computer system, the CPU executes the bootstrap program, wherein the bootstrap program checks the boot memory to determine if the boot program and the CPU operating system code stored therein are usable for the boot-up operation;
   wherein upon determining that the boot program and the CPU operating system code being stored in the boot memory are not usable for the boot-up operation, the CPU is directed by the bootstrap program to download a copy of the CPU operating system code from an external source via the I/O port into the main memory to allow the boot-up operation to be continued.

8. The system of claim 7 wherein upon determining that the boot program and the CPU operating system code that are stored in the boot memory are usable for the boot-up operation, the CPU is directed by the bootstrap program to perform the boot-up operation using the boot program and the CPU operating system code being stored in the boot memory.

9. The system of claim 7 wherein after the copy of the CPU operating system code has been downloaded into the main memory, the CPU executes the copy of the CPU operating system code thereby causing the copy of the CPU operating system code in the main memory and a copy of the boot program retrieved via the I/O port to be copied into the boot memory to replace the boot program and the CPU operating system code that are currently stored in the boot memory; and wherein copies of the boot program and the CPU operating system code that have been copied into the boot memory are used to initiate the next boot-up operation.

10. The system of claim 7 wherein the boot memory is implemented using a FLASH memory that is programmable.

11. The system of claim 7 wherein the bootstrap memory is implemented using a field programmable gate array.

12. A system for providing a boot-up operation for a computer system, comprising:
   a CPU;
   a main memory;
   a boot memory configured to store contents including a boot program and CPU operating system code, wherein the boot program is configured to initiate a boot up operation of the computer system, and wherein the boot memory is implemented using a FLASH memory;
   a bootstrap memory configured to store a bootstrap program, wherein the bootstrap memory is implemented using one or more memory blocks in a field-programmable gate array; and
   an I/O port;
   wherein upon system initiation, and before the boot program initiates the boot up operation of the computer system, the CPU executes the bootstrap program, wherein the bootstrap program checks the boot memory to determine if the boot memory contents are usable for the boot-up operation;
   wherein upon determining that the boot memory contents are not usable for the boot-up operation, the CPU is directed by the bootstrap program to download a copy of the CPU operating system code via the I/O port into the main memory to allow the boot-up operation to be continued;
   wherein after the copy of the CPU operating system code has been downloaded into the main memory, the CPU executes the copy of the CPU operating system code thereby causing the copy of the CPU operating system code in the main memory and a copy of the boot program retrieved via the I/O port to be copied into the boot memory; and
   wherein copies of the boot program and the CPU operating system code in the boot memory are used to initiate the next boot-up operation.

13. The system of claim 12 wherein upon the CPU executing the bootstrap program, the CPU is directed to check the main memory for error; and wherein if an error is found in the main memory, the CPU is directed to suspend any further operations.

14. The system of claim 12 wherein upon determining that the boot memory contents are usable for the boot-up operation, the CPU is directed by the bootstrap program to perform the boot-up operation using the boot program and the CPU operating system code that are stored in the boot memory.

15. A method for providing a boot-up operation for a computer system having a CPU, a main memory, a boot memory having a boot program and CPU operating system code residing therein, a bootstrap memory having a bootstrap program residing therein and an I/O port, wherein the boot program is configured to initiate a boot up operation of the computer system, comprising:

before the boot program initiates the boot up operation of the computer system, executing the bootstrap program residing in the bootstrap memory to check contents of the boot memory to determine if the boot memory contents are usable for the boot-up operation;

upon determining that the boot memory contents are not usable for the boot-up operation, downloading a copy of the CPU operating system code from an external source via the I/O port into the main memory; and using the downloaded copy of the CPU operating system code to continue the boot-up operation.

16. The method claim 15 further comprising:

prior to executing the bootstrap program to check the contents of the boot memory, checking the main memory for error; and suspending any further operations if an error is found in the main memory.

17. The method of claim 15 further comprising:

upon determining that the boot memory contents are usable for the boot-up operation, performing the boot-up operation using the boot program and the CPU operating system code that are currently stored in the boot memory.

18. The method of claim 15 further comprising:

after the copy of the CPU operating system code has been downloaded into the main memory, executing the copy of the CPU operating system code to cause the copy of the CPU operating system code in the main memory and a copy of the boot program retrieved via the I/O port to be copied into the boot memory; and using copies of the boot program and the CPU operating system code in the boot memory to initiate the next boot-up operation.

19. The method of claim 15 wherein the boot memory is implemented using a FLASH memory that is programmable.

20. The method of claim 15 wherein the bootstrap memory is implemented using a field programmable gate array.

21. A method for providing a boot-up operation for a computer system having a CPU, a main memory, a boot memory having a boot program and CPU operating system code residing therein, a bootstrap memory having a bootstrap program residing therein and an I/O port, wherein the boot program is configured to initiate a boot up operation of the computer system, comprising:

before the boot program initiates the boot up operation of the computer system, executing the bootstrap program to determine if contents of the boot memory are usable for the boot-up operation;

upon determining that the boot memory contents are not usable for the boot-up operation, downloading a copy of the CPU operating system code via the I/O port into the main memory;

using the downloaded copy of the CPU operating system code to perform the boot-up operation;

copying the downloaded copy of the CPU operating system code and a copy of the boot program retrieved via the I/O port into the boot memory to replace the boot program and the CPU operating system code that are currently in the boot memory; and using copies of the boot program and the CPU operating system code that have been copied into the boot memory to initiate the next boot-up operation;

wherein the boot memory is implemented using a FLASH memory and the bootstrap memory is implemented using one or more memory blocks in a field-programmable gate array.

22. The method of claim 21 further comprising:

upon determining that the boot memory contents are usable for the boot-up operation, performing the boot-up operation using the boot program and the CPU operating system code that are currently stored in the boot memory.

23. The method of claim 21 further comprising:

prior to executing the bootstrap program to check the contents of the boot memory, checking the main memory for error; and suspending any further operations if an error is found in the main memory.

* * * * *